(12) United States Patent
Kluehspies

(10) Patent No.: US 6,942,293 B2
(45) Date of Patent: Sep. 13, 2005

(54) NECK REST FOR THE BACK REST OF AUTOMOBILE SEATS, IN PARTICULAR REAR SEATS

(75) Inventor: Roland Kluehspies, Ochsenfurt (DE)

(73) Assignee: ITW Automotive Products GmbH & Co. KG, Iserlohn (DE)

(*) Notice: Subject to any disclaimer, the term of this patent is extended or adjusted under 35 U.S.C. 154(b) by 0 days.

(21) Appl. No.: 10/889,022

(22) Filed: Jul. 13, 2004

(65) Prior Publication Data

US 2005/0023878 A1 Feb. 3, 2005

(30) Foreign Application Priority Data

Jul. 30, 2003 (DE) .......................................... 103 34 551

(51) Int. Cl.[7] .................................................. B60N 2/42
(52) U.S. Cl. .................................................. 297/216.12
(58) Field of Search ................................ 297/410, 391, 297/217.3, 284.1, 216.12, 216.1

(56) References Cited

U.S. PATENT DOCUMENTS 4,420,186 A * 12/1983 Vogt
4,657,304 A * 4/1987 Heesch et al.
4,720,146 A * 1/1988 Mawbey et al.
5,961,182 A * 10/1999 Dellanno
5,975,637 A * 11/1999 Geuss et al.
6,007,154 A * 12/1999 Parker et al.
6,550,856 B1 * 4/2003 Ganser et al.
6,761,403 B2 * 7/2004 Pal et al. ............... 297/216.12

* cited by examiner

Primary Examiner—Milton Nelson, Jr.
(74) Attorney, Agent, or Firm—Lowe Hauptman & Berner, LLP

(57) ABSTRACT

Neck rest for the back rest of the seats of automobiles, in particular for the back seat, the neck rest including two supporting rods which are accommodated by sockets in the back rest, by which a guiding portion and a supporting portion located above the guiding portion are provided, with the supporting portion being height adjustable relative to the guiding portion, the supporting portion includes at least a horizontal holding section provided with at least one guiding rod and having a deformable portion extending downwardly and adapted to support an upholstering portion, the guiding rod is accommodated by a hollow neck rest rod (20), in that the deformable portion with the upholstering portion and an accommodating channel of the supporting portion being designed such that the deformable portion is accommodated by an accommodating channel more or less depending upon the height of the supporting portion.

20 Claims, 1 Drawing Sheet

NECK REST FOR THE BACK REST OF AUTOMOBILE SEATS, IN PARTICULAR REAR SEATS

RELATED APPLICATIONS

The present application is based on, and claims priority from, German Application Number 103 34 551.5, filed Jul. 30, 2003, the disclosure of which is hereby incorporated by reference herein in its entirety.

FIELD OF THE INVENTION

The invention relates to a neck rest for the back rest of automobile seats.

BACKGROUND OF THE INVENTION

Neck rests for automobile seats are usually composed of a supporting portion and an upholstering portion. The supporting portion is accommodated by head supporting rods in sockets of the back rest. The socket is usually composed of sleeves. It is known to latch the head supporting rods into engagement with the sleeves at different height positions. However, it is also known to adjust the head supporting rods in height by means of an appropriate adjusting mechanism.

It is also known to provide the back rests of rear seats with neck rests in the rear of an automobile. An action as a neck rest requires that the rest has to present a certain height for the person sitting on the seat. This possibly can constitute an obstacle to the driver's vision while backing the vehicle up. Likewise, view to the rear by means of the interior driving mirror is impaired by high neck rests at the seat back of the rear seat.

SUMMARY OF THE INVENTION

It is the object of the invention to provide a neck rest for the seat backs of automobiles which can be selectively reduced in its height to make possible a better view to the rear.

The inventive neck rest is composed of two portions, i.e. a guiding portion and a supporting portion. The supporting portion is arranged above the guiding portion and is variable in height relative thereto. According to the invention, the guiding portion has a horizontal section and a deforming portion which joins it and partially extends upwards. The deforming portion, along with the horizontal portion, defines an accommodating channel. The supporting portion has guiding rods which are mounted on a horizontal holding portion. The guiding rods are guided vertically in the hollow neck rest rods. Furthermore, the supporting portion has a downwardly extending portion which carries an upholstering portion. The deformable portion with the upholstering portion and the accommodating channel are formed so as to cause the deformable portion to be received more of less by the accommodating channel in dependence on the height of the supporting portion.

The deformable portion forms some type of louvre which can be retracted partially or completely into the accommodating channel of the guiding portion. To this end, the accommodating channel is configured so as to naturally receive the upholstering portion as well.

According to an aspect of the invention, the holding portion and guiding portion substantially are of a rigid shape and are made of a relatively solid plastic, for example. According to another aspect of the invention, the deformable portion has an elastic portion which is connected to the upholstering portion and deforms upon displacement into the guiding portion.

Alternatively, the deformable portion can be composed of individual linked elements which are also moved into the accommodating channel in a louvre-like manner.

However, the essential thing is that the deformable portion, when in an extracted position, generates sufficient supporting forces if the person sitting on the seat hits his/her head rearwards against the neck rest because of an abrupt acceleration of the vehicle.

The supporting portion can be directly adjusted in height by hand, the guiding rods being locatable in different latch positions in the neck rest rods, for example. Alternatively, a suitable actuation device can be provided to displace the supporting portion. The purpose can be served by an appropriate electromagnetic actuation means, for example. It is also imaginable to effect an adjustment of the supporting portion in height via a pulling cable which is actuated from the driver side.

The inventive neck rest makes it possible to bring the neck rest to a low height, particularly on the rear seat, in order that the view to the rear be less impaired while backing the vehicle up or while looking into the interior driving mirror.

BRIEF DESCRIPTION OF THE DRAWING

The invention will be described in more detail below with reference to an embodiment illustrated in the drawings.

DETAILED DESCRIPTION OF THE INVENTION

Figure 1:
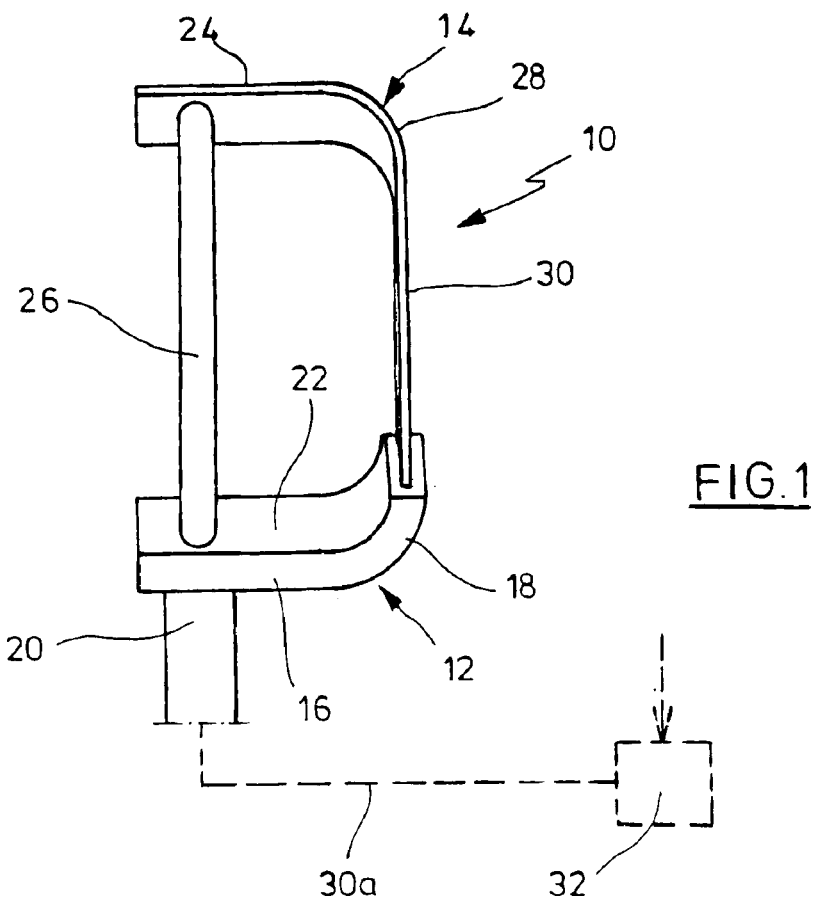
FIG. 1 extremely schematically shows a perspective view of a neck rest of the invention.
Figure 2:
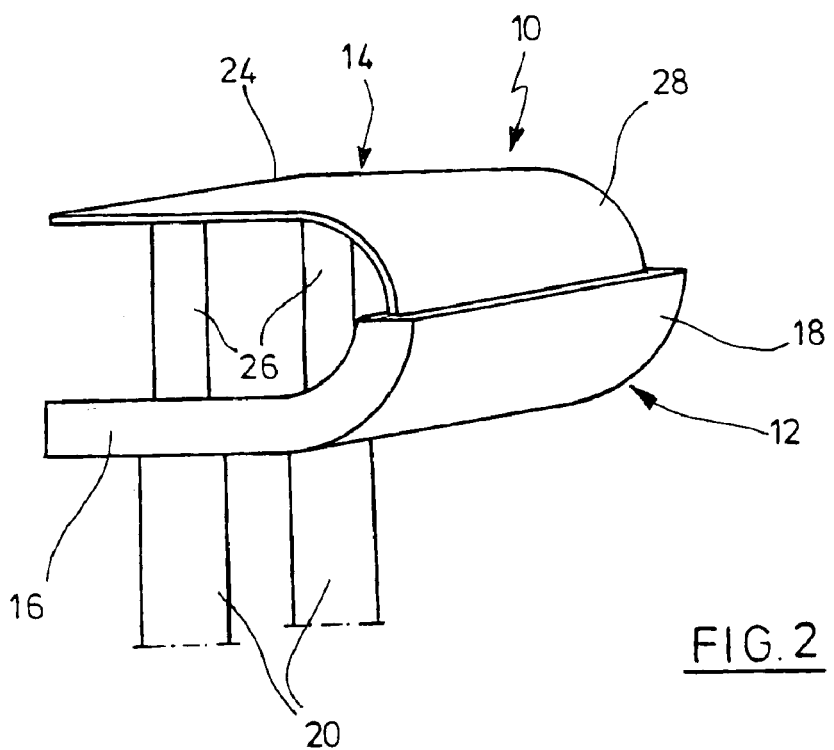
FIG. 2 shows a perspective view of the neck rest of FIG. 1 in a retracted position.

The neck rest 10 shown in FIGS. 1 and 2 has a guiding portion 12 and a supporting portion 14. The guiding portion 12 is provided with a horizontal portion 16 and a deforming portion 18 which is partially bent upwards, joins the horizontal portion 16, and extends approximately vertically at the end ("horizontal" and "vertical" mean the orientation of the designated portions when the neck rest is mounted on the back rest of an automobile seat that is not shown). The horizontal portion 16 has connected thereto neck rest rods 20 which are pushed into a socket (not shown) of a back (not shown) of an automobile seat. Sockets of this type in the form of neck rest sleeves or the like are generally known. Their configuration can be such as to receive the rods 20 merely in one position or also in various height positions, e.g. via respective latch positions of the rods 20 and sockets.

The guiding portion 12 defines an accommodating channel 22.

The supporting portion 14 has an upper horizontal holding section 24 which is of a relatively rigid design and has guiding rods 26 mounted at its underside. The guiding rods 26 are received by the hollow neck rest rods 20 (FIG. 2). Via an arc-shaped portion 28, the horizontal holding section 24 is joined by an elastically deformable portion 30 which engages the upper end of the accommodating channel 22. The deformable portion 30, for example, is an elastic strap of metal of plastic which can be guided within the accommodating channel 22 by providing the walls of the accommodating channel 22 with appropriate guide grooves (not shown). The deformable portion 30 accommodates an appropriate supporting pad which is not shown for reasons of simplicity here. It serves for absorbing the shock forces which occur when the head of the person sitting on the seat which is not shown strikes against the neck rest because of an abrupt acceleration.

The supporting portion 14 can be adjusted in its height and be moved downwards with respect to the guiding portion 12. This causes the guiding rods 26 to move into the head rest rods 20 and latch positions (not shown) can be predetermined between these rods to maintain a relative position occupied between the components 12 and 14. The most downwardly lowered position is shown in FIG. 2. It has received therein the portion 30 substantially in the accommodating channel 22 of the guiding portion 12. While the portion 30 is pushed into the accommodating channel 22 it will deform elastically. If it is necessary to push the lower end of the portion 30 into the accommodating channel 22 so far that this end has to be moved rightwards beyond the guiding rods 26 the lower end of the deformable portion 30 requires to be fitted with appropriate recesses to allow the adjustment described.

As mentioned before the guiding rods 26 can be latched in the neck rest rods 20 at different height positions. However, it is also perceivable to vary the height of the supporting portions 14, using an adjustment mechanism. This is outlined by a adjustment cable (Bowden control cable) 30a which is connected to the guiding rods 26 and is operated by an actuation means 32. The actuation means 32 can be an electric drive, for example. It is also imaginable to perform a manual operation from the driver's seat by shifting a lever (not shown) or the like.

In the Figures, the guiding portion is shown extending across the entire width of the neck rest. However, it can also extend over some part of its width only and can be arranged in place centrally, for example. While a strip of the supporting portion, i.e. portion 30, which is guided in the guiding portion undergoes deformation the remaining portions laterally therefrom unavoidably will be deformed as well so that a reduction in the height of the neck rest is achieved in any case.

What is claimed is:

1. A neck rest for a back rest of an automobile seat, the neck rest comprising:
   two supporting rods adapted to be accommodated by sockets in the back rest,
   a guiding portion, and
   a supporting portion being located above the guiding portion and being height adjustable relative to the guiding portion,
   wherein
   the supporting portion includes at least a horizontal holding section provided with at least one guiding rod and having a deformable portion extending downwardly and adapted to support an upholstery material,
   the guiding rod is accommodated by a hollow one of said supporting rods, and
   the deformable portion is accommodated by an accommodating channel of the guiding portion depending upon the height of the supporting portion relative to the guiding portion.

2. The neck rest of claim 1, wherein the supporting portion and the guiding portion are substantially rigidly structured.

3. The neck rest of claim 2, wherein the deformable portion has an elastic portion which is adapted to be connected to the upholstery material and deforms upon displacement into the accommodating channel of the guiding portion.

4. The neck rest of claim 2, wherein the deformable portion consists of a plurality of linked elements.

5. The neck rest of claim 1, wherein the supporting portion is connected to an arc shaped portion through which the supporting portion extends into the deformable portion.

6. The neck rest of claim 1, wherein the horizontal holding section is joined by an arc shaped portion which is connected to the deformable portion.

7. The neck rest of claim 1, wherein said at least one guiding rod is fixable in the hollow supporting rod at various elevated positions.

8. The neck rest of claim 1, further comprising electromechanical actuation means for moving the supporting portion.

9. The neck rest of claim 1, wherein the deformable portion has an elastic portion which is adapted to be connected to the upholstery material and deforms upon displacement into the accommodating channel of the guiding portion.

10. The neck rest of claim 1, wherein the deformable portion consists of a plurality of linked elements.

11. A neck rest for an automobile seat, said neck rest comprising:
   a supporting member adapted to be supported by the automobile seat;
   a lower member attached to said supporting member and having a cavity;
   an upper member being located above said lower member and being height adjustable relative to said lower member,
   a guiding member extending downwardly from said upper member and being supportable by said supporting member at various elevated positions so as to adjust a relative height of said upper member to said lower member; and
   a deformable portion adapted to support an upholstery material, said deformable portion extending downwardly from said upper member to said lower member and having a length received in said cavity of said lower member, wherein said length varies depending on the relative height of said upper member to said lower member.

12. The neck rest of claim 11, wherein said guiding member and said supporting member are telescopically received one in another.

13. The neck rest of claim 11, wherein the deformable portion is elastically deformable and elastically deforms when received in said cavity of said lower member.

14. The neck rest of claim 11, wherein the deformable portion includes a plurality of linked elements.

15. The neck rest of claim 11, wherein the deformable portion includes a slot at a lower end thereof to avoid interfering with said guiding member when the length of said deformable portion that is received in said cavity of said lower member is sufficient to reach said guiding member.

16. The neck rest of claim 11, wherein
said supporting member is attached to a rear end of said lower member, said lower member further comprising a front end provided with an opening leading into said cavity; and
said guiding member extends downwardly from a rear end of said upper member, said upper member further comprising a front end from which said deformable portion extends downwardly to be received in said cavity.

17. The neck rest of claim 11, wherein said guiding member is latchable to said supporting member at said elevated positions.

18. The neck rest of claim 11, further comprising a electrical or mechanical driving mechanism for adjusting the relative height of said upper member to said lower member.

19. The neck rest of claim 11, wherein said electrical or mechanical driving mechanism comprising a Bowden cable.

20. The neck rest of claim 11, wherein said guiding member is a rod that extends through said lower member to be telescopically received within said supporting member which is a hollow rod.

* * * * *